(12) United States Patent
Thiel et al.

(10) Patent No.: US 7,938,488 B2
(45) Date of Patent: May 10, 2011

(54) DEVICE FOR ADJUSTING THE DEPTH OF A SEAT FOR A MOTOR VEHICLE SEAT

(75) Inventors: Heiko Thiel, Sonnefeld (DE); Jochen Hofmann, Marktgraitz (DE); Gregor Kröner, Bischberg (DE)

(73) Assignee: Brose Fahrzeugteile GmbH & Co KG, Coburg, Coburg (DE)

( * ) Notice: Subject to any disclaimer, the term of this patent is extended or adjusted under 35 U.S.C. 154(b) by 162 days.

(21) Appl. No.: 11/922,711

(22) PCT Filed: Jun. 8, 2006

(86) PCT No.: PCT/DE2006/000994
§ 371 (c)(1),
(2), (4) Date: Jan. 11, 2008

(87) PCT Pub. No.: WO2006/136133
PCT Pub. Date: Dec. 28, 2006

(65) Prior Publication Data
US 2009/0085387 A1    Apr. 2, 2009

(30) Foreign Application Priority Data

Jun. 21, 2005    (DE) .......................... 10 2005 029 665

(51) Int. Cl.
*B60N 2/00*    (2006.01)
*B60N 2/02*    (2006.01)
(52) U.S. Cl. ..................... 297/312; 297/284.11; 297/337
(58) Field of Classification Search .................. 297/312, 297/337, 340, 284.11; 248/424
See application file for complete search history.

(56) References Cited

U.S. PATENT DOCUMENTS
6,135,556 A * 10/2000 Chu et al. ...................... 297/337
(Continued)

FOREIGN PATENT DOCUMENTS
DE    199 01 076 A1    7/2000
(Continued)

OTHER PUBLICATIONS

English translation of International Preliminary Examination Report for corresponding PCT application No. PCT/DE2006/000994, dated Jan. 16, 2008.

(Continued)

*Primary Examiner* — David Dunn
*Assistant Examiner* — Philip Gabler
(74) *Attorney, Agent, or Firm* — Christie, Parker & Hale LLP (57) ABSTRACT

A device for adjusting the seat depth of a motor vehicle seat includes a base element to be arranged in a manner fixed on the seat framework, a supporting element which is mounted in a longitudinally movable manner on the base element and is intended for supporting a seat user and guide device by means of which the supporting element is guided movably on the base element along an adjustment direction. The guide device includes a first guide mechanism, in the vicinity of which the supporting element is supported on the base element and at which the supporting element and the base element interact with play in a direction perpendicular to the adjustment direction and to the supporting direction, and a second guide mechanism with which the supporting element is guided on the base element in an essentially play-free manner perpendicular to the adjustment direction and to the supporting direction.

28 Claims, 8 Drawing Sheets

U.S. PATENT DOCUMENTS

| | | | |
|---|---|---|---|
| 6,203,107 B1* | 3/2001 | Jonsson | 297/337 |
| 6,293,622 B1* | 9/2001 | Horisawa | 297/344.1 |
| 6,302,482 B1 | 10/2001 | Moll et al. | |
| 6,419,317 B1* | 7/2002 | Westrich et al. | 297/284.11 |
| 6,688,692 B2* | 2/2004 | Phillips et al. | 297/337 |
| 6,742,743 B2* | 6/2004 | Saint-Jalmes | 244/122 R |
| 6,767,062 B2* | 7/2004 | Piretti | 297/337 |
| 6,926,361 B2* | 8/2005 | Link | 297/337 |
| 6,986,550 B2* | 1/2006 | Gevaert et al. | 297/337 |
| 6,994,400 B2* | 2/2006 | Koepke et al. | 297/337 |
| 7,097,248 B2* | 8/2006 | Voss | 297/313 |
| 7,172,250 B2* | 2/2007 | Wu | 297/344.1 |
| 7,427,106 B2* | 9/2008 | Williamson et al. | 297/337 |
| 2002/0180248 A1* | 12/2002 | Kinoshita et al. | 297/284.1 |
| 2002/0190558 A1* | 12/2002 | Phillips et al. | 297/337 |
| 2002/0190559 A1* | 12/2002 | Phillips et al. | 297/337 |
| 2005/0017551 A1* | 1/2005 | Kato et al. | 297/65 |
| 2005/0061941 A1 | 3/2005 | McMains | |
| 2007/0132293 A1* | 6/2007 | Moriyama et al. | 297/337 |
| 2009/0108615 A1* | 4/2009 | Akiya et al. | 296/65.03 |

FOREIGN PATENT DOCUMENTS

| | | |
|---|---|---|
| FR | 2 754 496 A1 | 4/1998 |

OTHER PUBLICATIONS

International Search Report, dated May 29, 2007, corresponding to PCT/DE2006/000994.

* cited by examiner

DEVICE FOR ADJUSTING THE DEPTH OF A SEAT FOR A MOTOR VEHICLE SEAT

CROSS-REFERENCE TO A RELATED APPLICATION

This application is a National Phase Patent Application of International Patent Application Number PCT/DE2006/000994, filed on Jun. 8, 2006, which claims priority of German Patent Application Number 10 2005 029 665.3, filed on Jun. 21, 2005.

BACKGROUND

The invention relates to a device for adjusting the seat depth of a motor vehicle seat.

A device for adjusting the seat depth comprises a base element which is to be arranged in a manner fixed on the seat framework, and a supporting element which is mounted displaceably in an adjustment direction on the base element and serves to support certain body parts of a seat user, for example the thighs, wherein the weight acts on the supporting element in a supporting direction. The supporting element is assigned guide means, by means of which the supporting element is guided movably, in particular displaceably, on the base element in the adjustment direction.

Such a device for adjusting the seat depth can be used, in particular, as a "device for adjusting the seat cushion depth", with the base element forming part of a pad support on which a seat pad, which is oriented essentially horizontally in its use position, is arranged, and the supporting element, as a leg support, can be displaced together with an additional pad arranged thereon in an adjustment direction, in particular the "longitudinal direction of the seat", in order to set the effective length of the entire seat cushion provided for a seat user.

In this case, the smallest settable effective length of the seat cushion in the longitudinal direction of the seat corresponds to the "minimum extension" of the supporting element with respect to the base element, and the maximum settable effective lengths of the seat pad corresponds to the "maximum extension" of the supporting element with respect to the base element.

The guide means, which permit an adjustment of the supporting element with respect to the base element in order to set the effective length of a seat cushion, are usually loaded during a setting operation by the considerable weight of an occupant located on the corresponding vehicle seat. The guide means therefore generally comprises two guide slots which extend in the adjustment direction, in order to ensure an adjustment movement which is as rectilinear as possible without the vehicle occupant feeling that the leg support is tilting. However, this can result in the guide means jamming, since there is an over-determining tendency in such a system.

SUMMARY

The invention is therefore based on the problem of improving a device for adjusting the seat depth of the type mentioned at the beginning in respect of the seat element being adjusted with respect to the base element in a smooth-running and at the same time defined manner and in a manner as free from tilting as possible.

According to the invention the guide means comprise a first guide mechanism at which the supporting element is supported on the base element and at which the supporting element and the base element interact with a certain amount of play perpendicular to the adjustment direction of the supporting element (and perpendicular to the supporting direction of the weight, in which direction, during correct use of the device for adjusting the seat depth, the weight of a vehicle occupant acts on the device for adjusting the seat depth). Furthermore, the guide means has a second guide mechanism with which the supporting element is guided in an essentially play-free manner with respect to the base element—as viewed in the spatial direction running perpendicularly to the adjustment direction and to the supporting direction.

The solution according to the invention is based on the finding that an essentially play-free guide with respect to the base element of the supporting element (for example in the form of a leg support) of a device for adjusting the seat depth is possible—without the risk of jamming because of the guide means being over-determined—if the reception of the weight exerted by a vehicle occupant during use, on the one hand, and ensuring that guidance is free from play, on the other hand, are distributed to two different guide mechanisms.

The first guide mechanism, which is to absorb the weight occurring during use of the device for adjusting the seat depth such that said weight is passed on by the supporting element into the base element and therefore into the seat framework, extends in an (essentially horizontal) direction which runs both perpendicularly to the adjustment direction of the supporting element (generally in accordance with a longitudinal axis of the seat or longitudinal axis of the vehicle in the fitted state of the vehicle seat) and also perpendicularly to the direction of action of the weight (which, in the case of a leg support—based on the state in which it is fitted in a motor vehicle—runs in accordance with the vertical axis of the vehicle). On account of the remaining play which, in the case of an essentially planar supporting element, relates to the spatial direction lying in the plane of the supporting element perpendicular to the adjustment direction, use can be made of a second guide mechanism which, on account of its structure, ensures an essentially play-free adjustment of the supporting element with respect to the base element without there being the risk of the guide means being over-determined; jamming of the guide means during operation is therefore avoided.

In one exemplary embodiment the first guide mechanism comprises at least two longitudinal guides which are spaced apart from each other transversely with respect to the adjustment direction of the supporting element (and transversely with respect to the supporting direction of the weight) and each extend in the adjustment direction and between which the second guide mechanism is located. This makes it possible for the central, second guide mechanism, which is free from play transversely with respect to the adjustment direction, to be relieved to the maximum extent from tilting forces which are caused by the weight of a seat user, in particular if the leg support is unevenly loaded, and which, in the case of the previously described design and arrangement of the first guide mechanism, are absorbed by the two outer longitudinal guides of the first guide mechanism which is affected by play.

According to an exemplary embodiment of the invention, the first guide mechanism, in particular in each longitudinal guide of the first guide mechanism, comprises at least one guide element which engages in a guide track extending in the adjustment direction and is mounted movably in the adjustment direction in the guide track. The latter can be, for example, a guide slot in which the assigned guide element engages in a positive-locking manner. In this case, the arrangement is such that one of the two said components of the first guide mechanism, i.e. the guide element or the guide track, is arranged on the supporting element and the other of the two components of the guide mechanism is arranged on the base element. In this embodiment of the invention, the component provided with the guide elements is supported in the region of the guide tracks on the other component of the other guide mechanism in such a manner that the weight of a seat user can be absorbed here and can be passed on via the base element into the seat framework. In this case, the respective guide element is mounted in the assigned guide track with play perpendicular to the adjustment direction and to the direction of action of said weight.

In order to ensure an essentially play-free guidance of the supporting element on the base element, the additionally provided, second guide mechanism, which preferably extends between two longitudinal guides of the first guide mechanism, comprises two guide profiles which are movable in the adjustment direction with respect to each other and intermesh in a play-free manner perpendicular to the adjustment direction of the supporting element and perpendicular to the supporting direction of the weight. The guide profiles here may be, for example, guide profiles (guide rails) which are U-shaped in cross section and additionally have angled, free ends.

The supporting element and the base element can be supported on each other transversely with respect to the adjustment direction via the two guide profiles which are movable with respect to each other in the adjustment direction. Of particular importance here is a play-free supporting of the two guide profiles, which are movable with respect to each other, along the horizontal transverse direction of the vehicle, i.e. along a direction which extends both perpendicularly to the adjustment direction of the supporting element with respect to the base element and perpendicularly to the direction of action of the weight (of a seat user).

Furthermore, means are provided for locking a previously set position of the supporting element with respect to the base element, to be precise, in particular, with the use of a locking element which can be locked and unlocked by pivoting (for example about an axis extending in the adjustment direction of the seat element), by at least one locking tooth of the locking element optionally being brought into engagement with at least one of a plurality of latching points arranged consecutively in the adjustment direction.

The latching points may be latching openings which are formed on one of the guide profiles, for example on the base surface of a guide profile which is U-shaped in cross section.

The locking element is then preferably arranged on the other of the two guide profiles, advantageously within a space which is at least partially enclosed by the guide profile, for example between the two lateral limbs of a guide profile which is essentially U-shaped in cross section.

According to an exemplary development of this embodiment of this invention, the other guide profile likewise has openings (in particular in its base surface) through which the at least one locking tooth of the locking element reaches in the locked state (in addition to the latching points on the one guide element) (double-section locking).

In order to prevent unintentional resetting of the device for adjusting the seat depth, the locking means are elastically prestressed in the direction of the locked state, for example by means of an elastic element which acts on the locking element in such a manner that it is in engagement with at least one assigned latching point.

The effect achieved in particular by the combination of pivotability of the locking means with the double-section design of the locking mechanism is that the locking means are subjected to a shearing stress and not to a bending stress. By this means, the components of the locking means, i.e. in particular, the locking element with the locking teeth provided thereon, can be made from plastic.

In the case of a device for adjusting the seat depth which can be actuated manually by means of an actuating handle (arranged on the supporting element), the actuating handle preferably serves at the same time to unlock the locking means. For this purpose, the actuating handle, which is mounted movably, in particular pivotably, in a suitable manner, has an extension which, when a force is exerted on the actuating handle in the adjustment direction, acts on a locking element of the locking means in such a manner that the locking means are transferred into the unlocked state.

BRIEF DESCRIPTION OF THE DRAWINGS

Further details and advantages of the invention will become clear in the description below of an exemplary embodiment with reference to the figures, in which:

FIG. 1b shows a longitudinal section through the arrangement from FIG. 1a.

FIG. 1c shows a perspective exploded illustration of the arrangement from FIG. 1a.

FIG. 1d shows a frontal exploded illustration of the arrangement from FIG. 1a.

FIG. 2b shows a longitudinal section through the arrangement from FIG. 2a.

DETAILED DESCRIPTION

Figure 5:
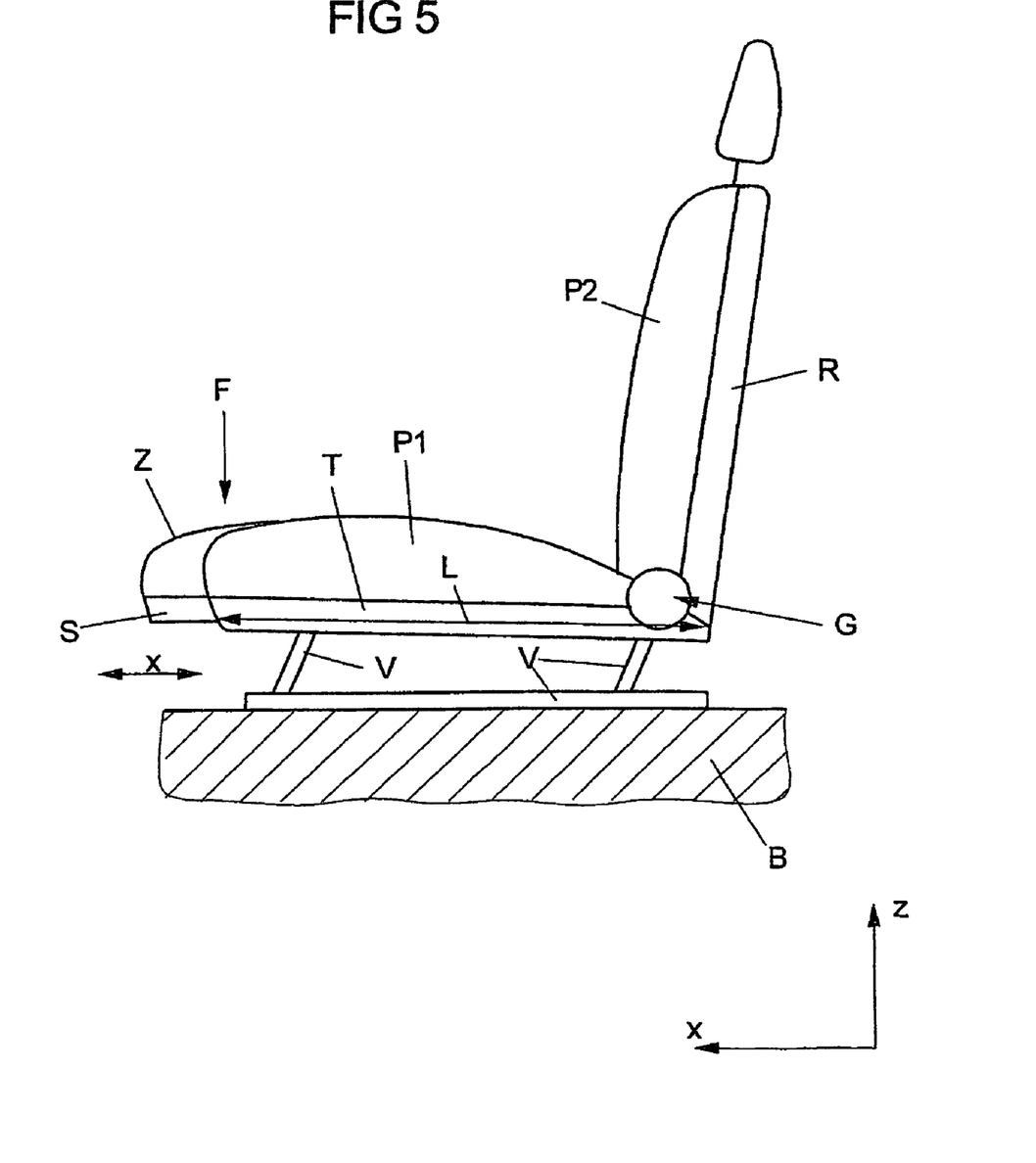
FIG. 5 shows a schematic illustration of a vehicle seat with a device for adjusting the seat depth.

FIG. 5 illustrates a seat framework G of a motor vehicle seat, which comprises a seat support T which can be arranged on a floor subassembly B of a motor vehicle via an adjustment mechanism V, and a backrest R which is coupled pivotably to the seat support T. The seat support T bears a seat pad P1, on which a vehicle occupant can sit, and the backrest R bears a backrest pad P2 for supporting a seat user's back.

In the case of the vehicle seat illustrated schematically in FIG. 5, the effective length L of the seat cushion, provided for a seat user, in the longitudinal direction x of the seat (corresponding to the longitudinal direction of the vehicle or direction of travel when a seat is fitted in a motor vehicle) can be set by a supporting element S being mounted in a longitudinally displaceable manner on the seat support, said supporting element bearing an additional pad Z, which adjoins the seat pad P1 in the longitudinal direction x of the seat, and being displaceable in the longitudinal direction x of the seat. The effective length of the entire seat cushion P1, Z, on which a vehicle occupant can sit, depends on how far the supporting element S is pulled out in the longitudinal direction x of the seat.

In the present case, the supporting element S is a "leg support" which serves to support a seat user's thighs and which is mounted movably in the longitudinal direction x of the seat in order to set the effective length L of the entire seat cushion, i.e. for adjustment of the seat cushion depth. In this case, the smallest effective length L which can be set for the seat cushion P, Z in the longitudinal direction x of the seat corresponds to the "minimum extension" of the supporting element S, and the maximum effective length L which can be set for the seat cushion P, Z corresponds to the "maximum extension" of the supporting element S.

If a vehicle occupant is on the vehicle seat illustrated in FIG. 5, then the weight F acts on the seat pad P1 and especially also on the additional pad Z and the leg support S in the vertical direction z. This corresponds approximately to the direction of an upright backrest R of a motor vehicle seat or the "vertical axis of the vehicle"—with reference to the seat fitted in a motor vehicle.

A specific exemplary embodiment of a mechanism for adjusting the supporting element S will be described below with reference to FIGS. 1a to 4. The mechanism illustrated with reference to FIGS. 1a to 4 for the seat depth adjustment can also be used on different subassemblies of a vehicle seat in the form of a device for adjusting the seat cushion depth, which is illustrated by way of example in FIG. 5.

FIGS. 1a to 1e and 2a to 2d show a device for adjusting the seat depth which can be used in the vehicle seat illustrated schematically in FIG. 5, to be precise, firstly, at a minimum extension of the supporting element, corresponding to the smallest effective length L which can be set for the entire seat cushion P1, Z (FIGS. 1a to 1e) and, secondly, at a maximum extension of the supporting element, corresponding to the greatest effective length L which can be set for the entire set cushion P1, Z from FIG. 5 (FIGS. 2a to 2d). In both cases, the respective supporting element 2 serving as the leg support is locked in the (minimum or maximum) extension set with respect to a base element 1 to be arranged in a manner fixed on the seat framework.

In the description below, reference is made in each case at the same time to FIGS. 1a to 1e, on the one hand, and FIGS. 2a to 2d, on the other hand. Both groups of FIGS. show an identical device for adjusting the seat depth in the locked state; the only difference is that FIGS. 1a to 1e illustrate the state corresponding to a minimum extension of the supporting element and FIGS. 2a to 2d illustrate the state corresponding to a maximum extension of the supporting element.

The base element 1 is a (profiled) part, preferably composed of plastic or, if appropriate, of sheet metal, which is to be fastened to the seat support T of a motor vehicle seat of the type illustrated in FIG. 5. A supporting element 2, for example designed as sheet-metal part and serving, in the case of a vehicle seat of the type illustrated in FIG. 5, as a leg support S is arranged displaceably in the longitudinal direction x of the seat on said base element 1 which is to be arranged in a manner fixed on the seat framework. Two separate guide mechanisms 3, 4 provided for this.

A first guide mechanism 3, which serves to guide the supporting element 2 with respect to the base element 1 in the longitudinal direction x of the seat, comprises two longitudinal guides 3a, 3b which are provided on the lateral edges of the base element 1 and of the supporting element 2 in a manner spaced apart from each other transversely with respect to the adjustment direction x (which coincides with the longitudinal direction x of the seat) of the supporting element 2 and transversely with respect to the direction of action z of the weight F exerted on the supporting element 2 during normal use. Each of the two longitudinal guides 3a, 3b comprises a guide track 32 which extends in the adjustment direction x and is in the form of a slotted-guide mechanism which is designed as an elongated hole and in which a respective guide element 31, which is fixed on the base element 1, engages in a longitudinally displaceable manner. The respective guide element 31 is formed by a guide sleeve fastened to a threaded hole 33 of the base element 1 by means of a threaded element (screw). The respective guide element 31 is dimensioned with respect to the assigned guide track 32 in such a manner that there is a predetermined minimum play along the horizontal transverse axis y extending perpendicular to the adjustment direction x and perpendicular to the supporting direction z of the weight F.

A respective longitudinally extending supporting region 34 runs in the region of the two longitudinal guides 3a, 3b via which the supporting element 2 can be supported in the (vertical) direction z on the base element 1, in which direction the weight F acts during normal use on the supporting element 2, which is in the form of a leg support, said weight pressing the supporting element against the base element 1, to be precise, in particular, against the two longitudinally extending supporting regions 34 provided in the region of the longitudinal guides 3a, 3b.

As a result, the two lateral longitudinal guides 3a, 3b permit guidance of the protective element 2 with respect to the base element 1 in the adjustment direction x, with there being a certain horizontal play transversely with respect to the adjustment direction x, and, in addition, the weight F which acts on the supporting element 1 being absorbed in the region of the longitudinal guides 3a, 3b by means of supporting regions 34 provided on the base element 1.

Owing to the fact that the two longitudinal guides 3a, 3b lie on a respective lateral edge of the base element 1 and of the supporting element 2 in a manner spaced apart from each other horizontally transversely with respect to the adjustment direction x, by means of the absorption, which takes place in the region of said longitudinal guides 3a, 3b, and passing on of weight F into the seat framework, tilting of the supporting element 2 about an axis running in the adjustment direction x due to the supporting element 2 being unevenly loaded with weight is avoided.

In addition to the first guide mechanism 3, which is formed by the two longitudinal guides 3a, 3b, a second guide mechanism 4 is provided, via which the supporting element 2 is mounted on the base element 1 in a manner such that it can likewise be displaced in the adjustment direction x. The second guide mechanism 4 is configured as a rail guide which is formed by two guide profiles in the form of guide rails 41, 42 (in cross section essentially U-shaped profiled parts with angled ends).

Each of the two guide rails 41, 42 formed by a profiled part has a respective base region 410 and 420, two limbs 411, 412 and 421, 422 protruding essentially vertically therefrom and two end sections 413, 414 and 423, 424 angled at the free ends of the respective limb 411, 412 and 421, 422.

The one (first) guide rail 421 is formed integrally on the base part 1 and the other (second) guide rail 42 is fastened to the supporting element 2. The two guide rails 421, 422 are arranged with respect to each other in such a manner that they engage around each other, with their base surfaces 410, 420 likewise running directly next to each other as, in each case in pairs, do two lateral limbs 411, 421 and 412, 422 and two respective angled end sections 413, 423 and 414, 424 of the two guide rails 41, 42.

In addition, fastening element 46, 47 are provided on the angled end sections 413, 414 of the first guide rail 41, to which fastening elements sliding guide elements 43, 44—preferably composed of plastic—are fastened. The latter engage over the angled end sections 423, 424 of the second guide rail 42 in such a manner that they are held captively and guided between the angled end sections 413, 414 of the first guide rail 41 and the sliding guide elements 43, 44 provided there.

The two guide rails 41, 42 are designed in such a manner that they intermesh in an essentially play-free manner along the horizontal transverse axis y, i.e. in a direction running perpendicularly both to the adjustment direction x and to the direction of action z of the weight F. This ensures defined, rattle-free guidance during the setting of the extension of the supporting element 1 with respect to the base element 2 (into a position between the minimum extension illustrated in FIGS. 1a to 1e and the maximum extension illustrated in FIGS. 2a to 2d).

The sliding guide elements 43, 44 which are composed of plastic can also serve to brace the two guide rails 41, 42 in relation to each other. In this connection, it is ensured in the present case structurally by the sliding guide elements 43, 44 being connected to the first guide rail 41 that the bracing of the second guide rail 42 against the first guide rail 41 by means of the sliding guide elements 43, 44 does not lead to the system being over-determined; this is because the two guide rails 41, 42 can additionally be supported on each other on their base surfaces 410, 420 (in the direction of action z of the weight F). Over-determining is avoided by, in order to brace the second guide rail 42 against the first guide rail 41, the sliding guide elements 43, 44 being pressed against the second rail 42 by the force provided for the bracing (in the direction of action z of the weight F); said sliding guide elements are mounted in this case on the assigned fastening elements 46, 47 of the first guide rail 1. If the two sliding guide elements 43, 44 (which are composed of plastic) act on the second guide rail 42 with the designated stress, they are fixed on the first guide rail 41 by hot stamping (melting) together with the assigned fastening elements 46, 47 on the first guide rail 41 (which is composed of plastic). For this purpose, the fastening elements 46, 47 are preferably formed by pins which reach through assigned openings in the sliding guide elements 43, 44 and the free end sections of which are fused thereto during the hot stamping operation. With this method of fastening, sheet-metal thickness tolerances of the second guide rail 42, which is composed of sheet metal, can be compensated for; and over-determining of the guide rail arrangement 41, 42 can be reliably avoided.

The essentially play-free second guide mechanism 4 forms a linear single-point guide which, by means of the previously described design and arrangement of the first guide mechanism 3, is at least partially relieved of the action of the weight F occurring during normal use of the device for adjusting the seat depth. In this case, the risk of the system jamming because of over-determining is avoided by the two longitudinal guides 3a, 3b of the first guide mechanism 3 having a sufficient amount of play in the horizontal transverse direction y.

As a result, a defined guidance of the guide element 2 with respect to the base element 1 in the adjustment direction x is ensured without there being the risk of the arrangement jamming due to the system being over-determined, with, at the same time, tilting of the supporting element 2 about an axis running in the adjustment direction x in the event of uneven loading of the supporting element 2 by the weight F being ruled out.

In order to actuate the device for adjusting the seat cushion depth, which device is formed by the base element 1 and the supporting element 2, an actuating handle 6 is provided in the form of an actuating lever which is coupled to the guide rail 42 on the seat-element side and therefore indirectly to the seat element 2 itself in a manner such that it can be pivoted about an axis 60. If, for the displacement of the seat element 2 with respect to the base element 1 in the adjustment direction x, a force acting in said direction is exerted on the actuating lever 6, then the latter simultaneously executes a pivoting movement about its pivot axis 60 and, in the process, acts via an extension 65, which is provided on the actuating lever 6, on a driver 55 of the locking means 5, by means of which the supporting element 2 can be locked with respect to the base element 1 in the respectively set relative position.

By manual action of force on the actuating lever 6 in the adjustment direction x, an unlocking of the locking means 5 can therefore take place at the same time followed by an adjustment movement of the supporting element 2 with respect to the base element 1 in the adjustment direction x.

The adjustment means 5 comprises a locking element 50 which is designed as a shaft, can be pivoted about an axis mounted parallel to the adjustment direction x and, for this purpose, is coupled at its ends to the respective bearing tab 40 protruding from the guide rail 42 of the supporting-element side. The pivotably mounted locking shaft 50 of the locking means 5 is therefore, like the actuating lever 6, assigned to the supporting element 2 and can be displaced together with the latter in the adjustment direction x. The locking shaft 50 extends in the cavity defined by the two guide rails 41, 42, i.e. between the mutually opposite, lateral pairs of limbs 411, 421; 412, 422 of the two guide rails 41, 42.

Three groups 50, 52, 53 of three locking teeth in each case are arranged on the outer circumference of the locking element in the form of a locking shaft 50 and protrude in the radial direction from the locking shaft 50. The locking teeth of a group 51 or 52 or 53 are each spaced apart from one another in the direction of extent of the locking shaft 50, i.e. in the adjustment direction x, and the individual groups 51, 52, 53 of locking teeth are in turn spaced apart from one another at a relatively large distance in said direction x.

Furthermore, a driver 55 protrudes from the locking shaft and is operatively connected to the extension 65 of the actuating lever 6 in such a manner that, when the actuating lever 6 is pivoted, its extension 65 acts on the driver 55 of the locking shaft 50 and pivots the latter about its axis extending in the adjustment direction x in order to unlock it. This takes place counter to the prestressing force of an elastic element 7 in the form of a torsion spring by means of which the locking shaft 50 is prestressed in the locking position shown in FIGS. 1a to 1e and 2a to 2d.

In this locking position, the groups 51, 52, 53 of locking teeth, which are provided on the locking shaft 50, at least partially engage in assigned latching points 59 in the form of latching openings which are provided in the base region 410 of the guide rail 41 on the base-element side and are arranged in a fixed position on the base element 1. By means of the engagement of the locking teeth, which are arranged on the supporting element 2 via the locking shaft 50, in the latching points 59 provided on the base element 1, locking of the supporting element 2 with respect to the base element 1 is therefore achieved, opposing an adjustment of the supporting element 2 in the adjustment direction x.

In this case, the groups 51, 52, 53 of locking teeth on the locking shaft 5, in the locked state, additionally also reach through corresponding groups of passage openings 56, 57, 58 in the base surface 420 of the guide rail 42 on the supporting-element side (double-section locking). This stabilizes the locked state.

By means of the pivotable mounting of the locking shaft 50 of the locking means 5, which locking shaft can accordingly be brought into and out of engagement with the associated latching points 59 by pivoting, and by means of the double-section locking described, the locking mechanism of the locking means 5 is subjected to a shearing stress and not to a bending stress. By this means, the locking shaft 50 with the groups 51, 52, 53 of locking teeth provided thereon can be made of plastic.

Figure 1A:
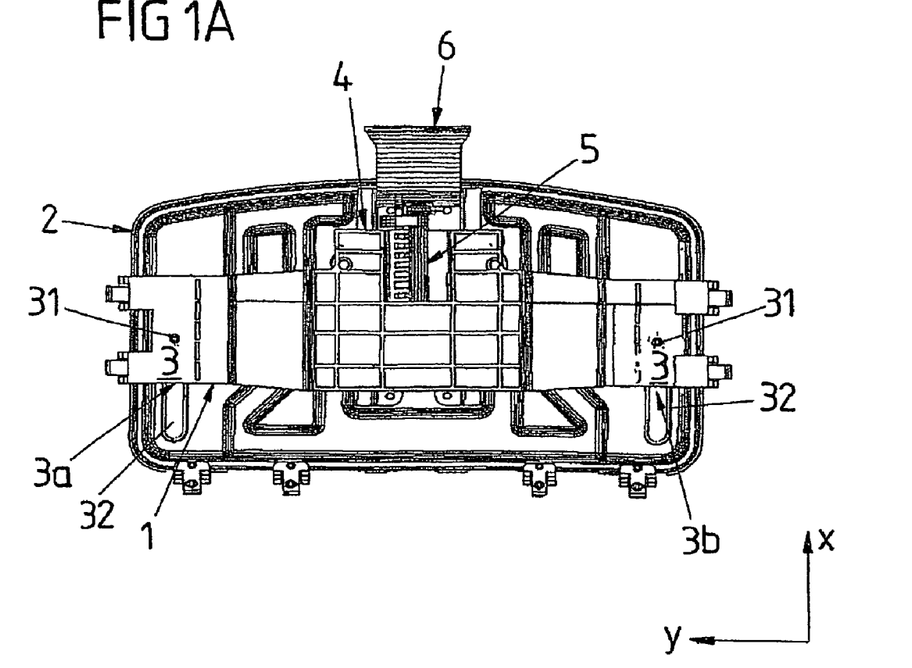
FIG. 1a shows a base element and a supporting element of a device for adjusting the seat depth, locked in the minimally extended state of the supporting element, in a plan view.
Figure 1B:
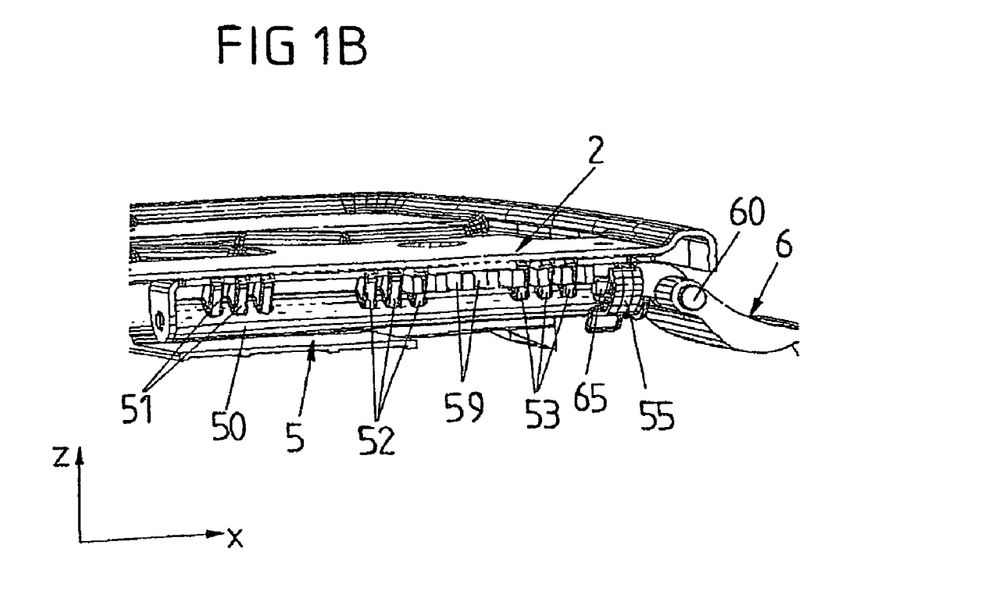
Figure 1C:
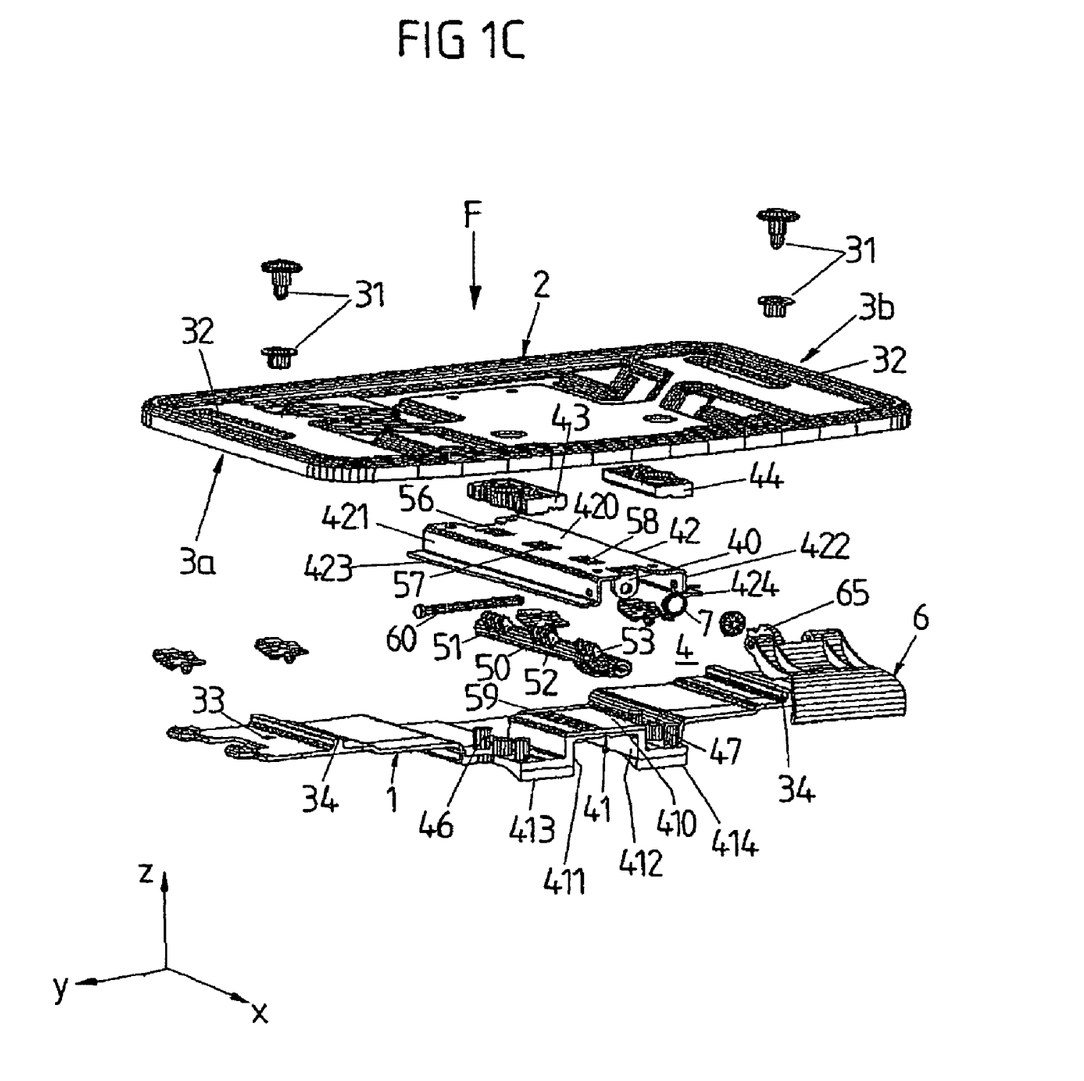
Figure 1D:
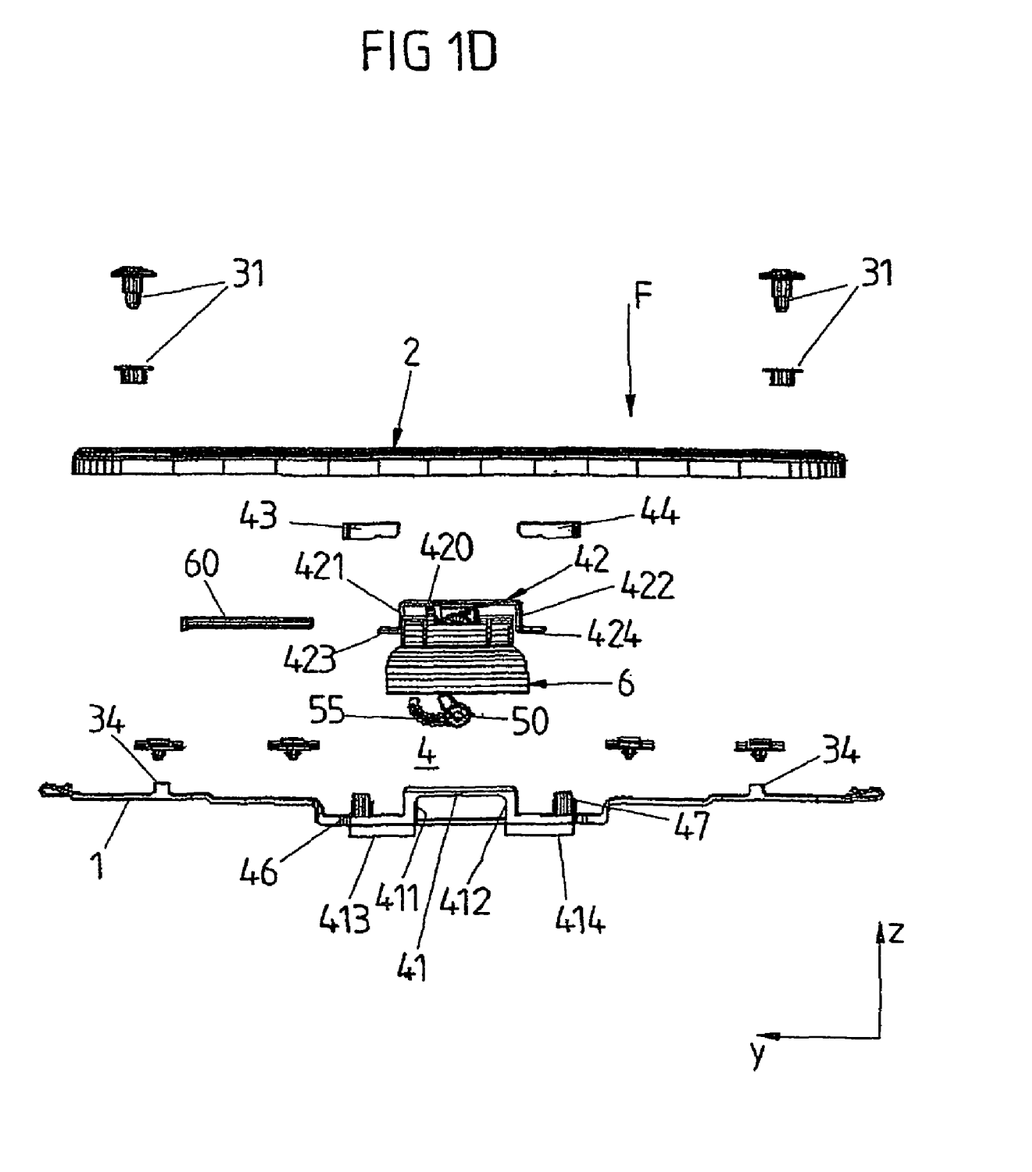
Figure 1E:
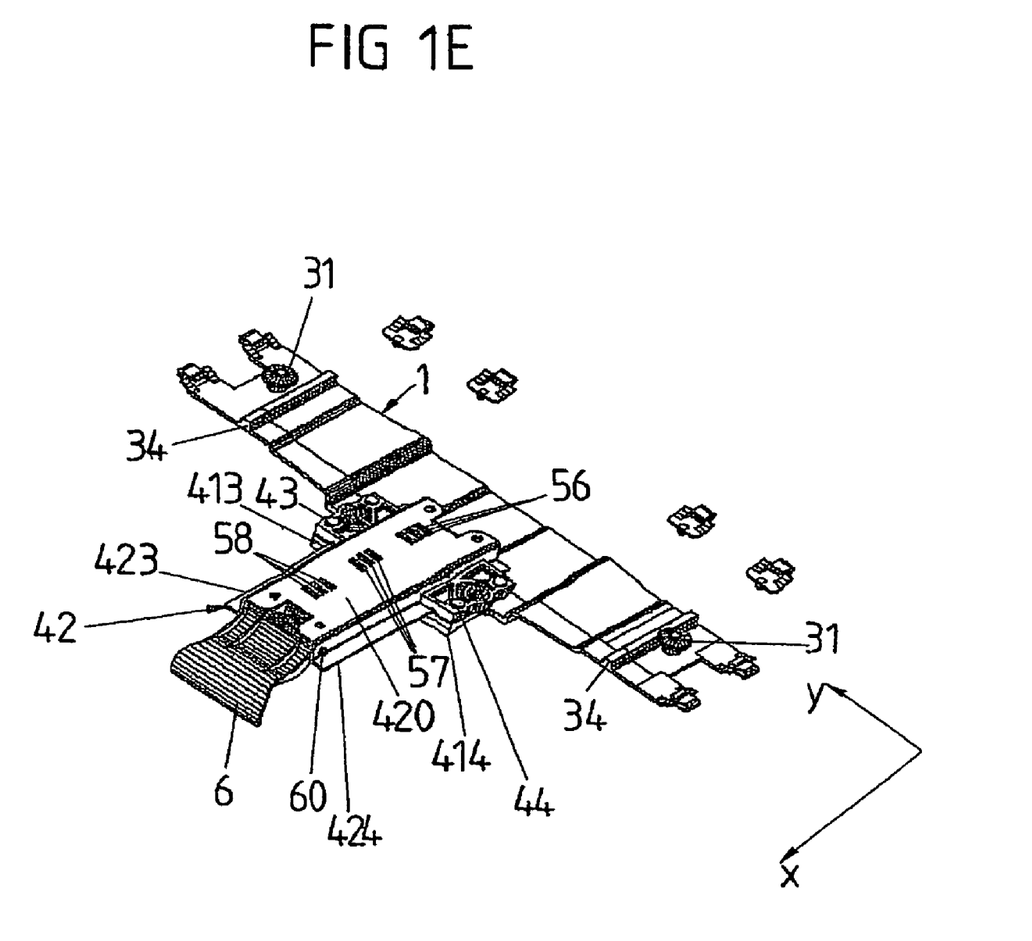
FIG. 1e shows a perspective illustration of the arrangement from FIG. 1a without the supporting element.
Figure 2A:
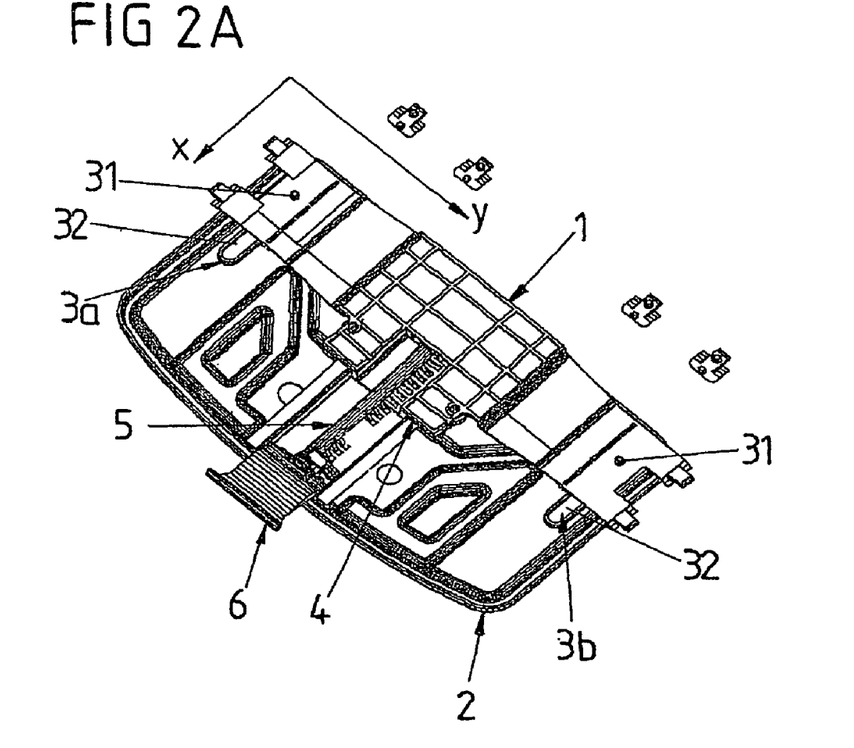
FIG. 2a shows the arrangement from FIG. 1a, locked with the supporting element extended to the maximum, in a plan view.
Figure 2B:
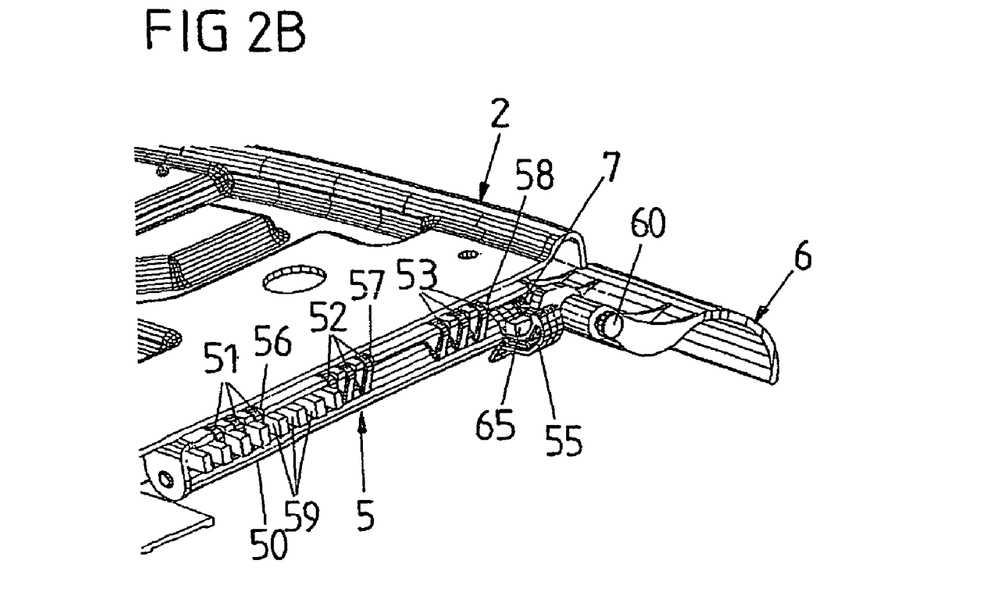
Figure 2C:
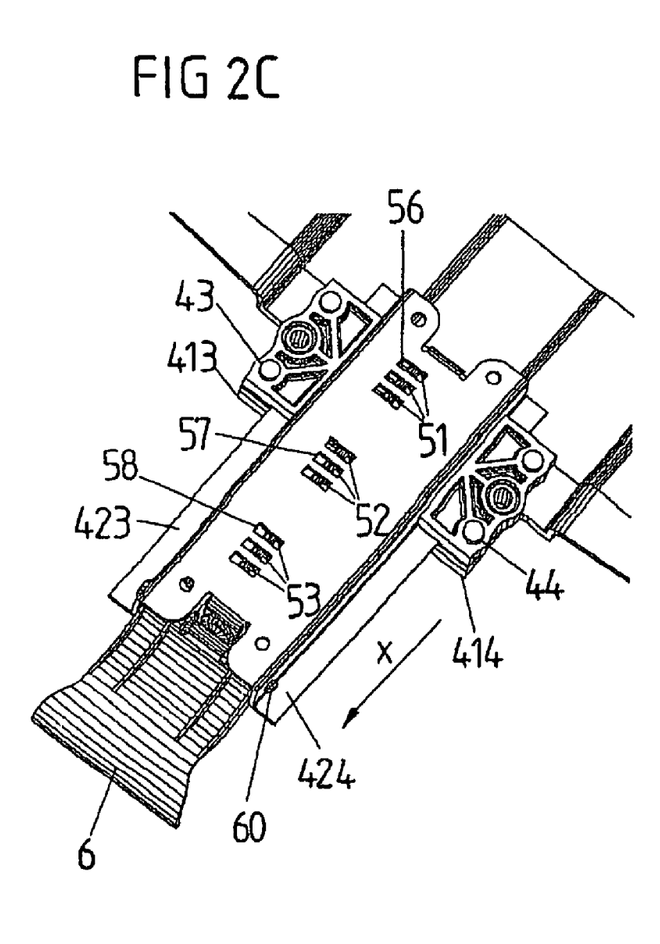
FIGS. 2c and 2d show two perspective illustrations of the arrangement from FIG. 2a without the supporting element.
Figure 2D:
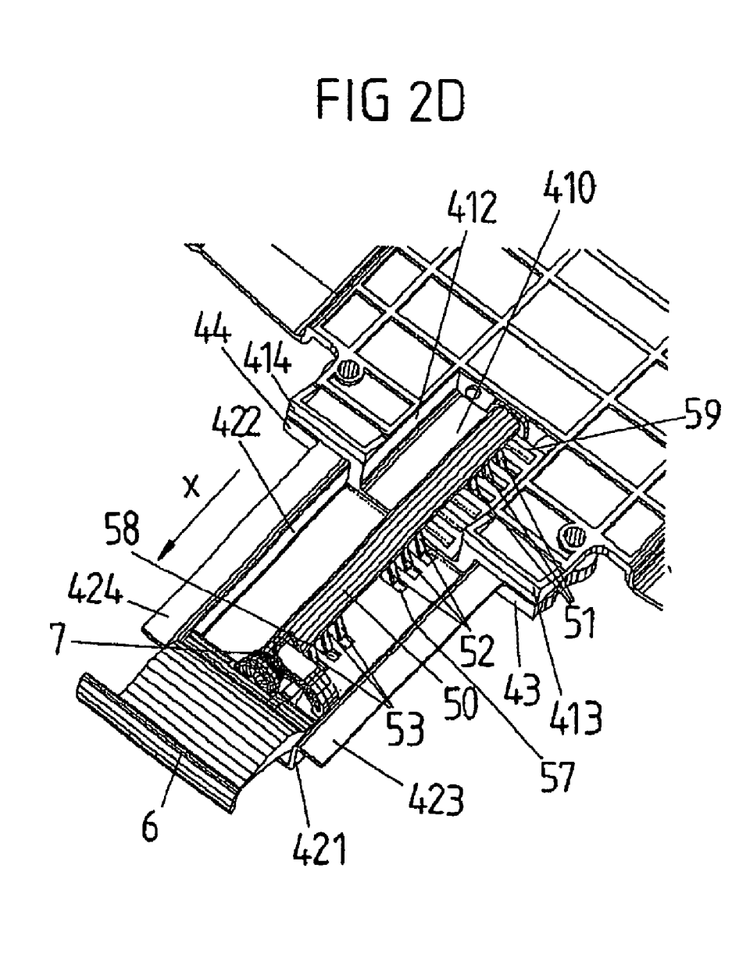
Figure 3:
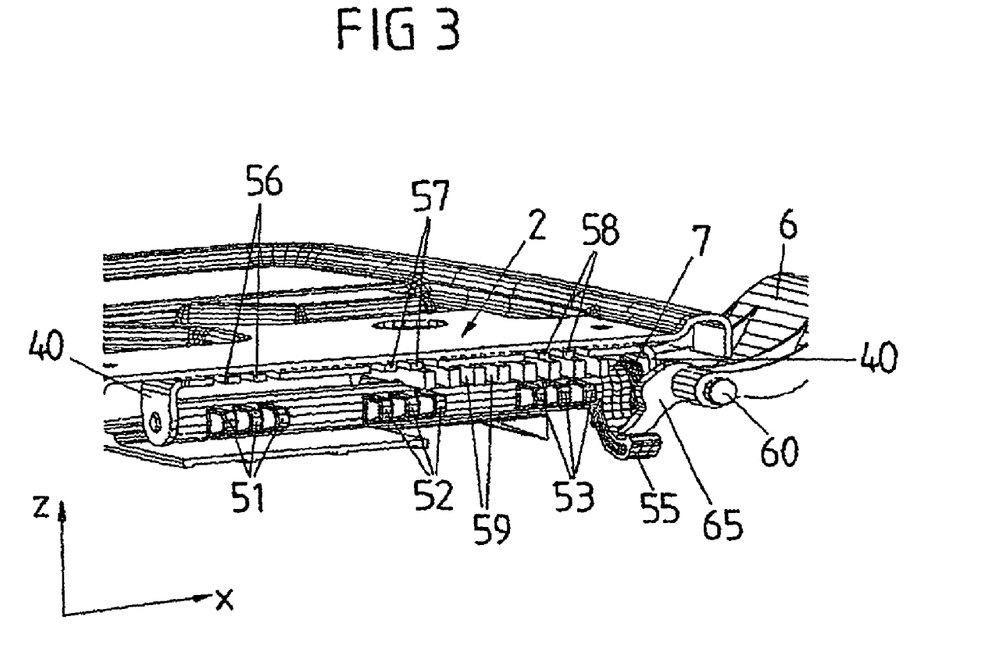
FIG. 3 shows a longitudinal section through the arrangement from FIG. 1a in the unlocked state.
Figure 4:
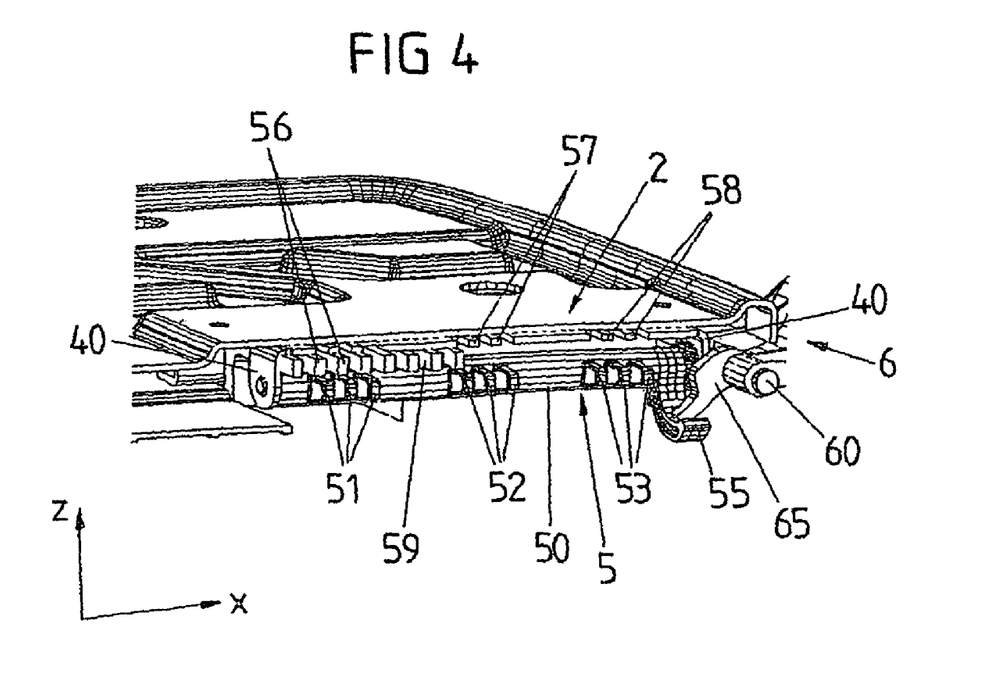
FIG. 4 shows a longitudinal section through the arrangement from FIG. 2a in the unlocked state.

FIGS. 3 and 4 illustrate the device for adjusting the seat depth, which comprises the supporting element 2 and the base element 1, firstly at minimum extension (FIG. 3) and secondly at maximum extension (FIG. 4), in the unlocked state, i.e. after unlocking of the corresponding arrangement which is in each case illustrated in the locked state in FIGS. 1a to 1e and 2a to 2d.

The unlocking of the locking means 5 takes place both in the minimally extended state of the device for adjusting the seat depth (corresponding to the transition of the state illustrated in FIGS. 1a to 1e to the state illustrated in FIG. 3) and at maximum extension (corresponding to the transition of the state shown in FIGS. 2a to 2d into the state shown in FIG. 4) in each case by the fact that, during pivoting of the actuating lever 6 of the device for adjusting the seat depth, at the same time—because of the interaction of the extension 65 of the actuating lever 6 with the driver 55 of the locking shaft 5—the locking shaft 5 is also pivoted in such a manner that its groups 51, 52, 53 of locking teeth come out of engagement with the assigned latching points 59 of the locking means 5. The state in which the locking teeth of the locking shaft 50 are raised out of the assigned latching points 59 is respectively illustrated in FIGS. 3 and 4 in the case of the minimum extension of the supporting element 2 and of the maximum extension of the supporting element 2.

The invention claimed is:

1. A device for adjusting the seat depth of a motor vehicle seat, the device comprising:
 a base element configured to be fixed on a seat framework;
 a support element mounted longitudinally movable on the base element and configured to support a seat user, wherein during correct use of the support element, a weight of the seat user acts on the support element in a support direction;
 a guide device configured to guide the support element movably on the base element along an adjustment direction;
 wherein the guide device comprises a first guide mechanism and a second guide mechanism different from the first guide mechanism for guiding the support element movably on the base element, the reception of the weight of the seat user during use being distributed to one of the guide mechanisms and guidance of the support element being distributed to the other guide mechanism;
 wherein the support element is supported on the base element in the vicinity of the first guide mechanism and wherein the support element and the base element interact with a predetermined minimum play in the vicinity of the first guide mechanism in a direction of a horizontal transverse axis perpendicular to the adjustment direction and perpendicular to the support direction for providing guidance of the support element on the base element along the adjustment direction with the predetermined minimum play in the direction of the horizontal transverse axis;
 wherein the first guide mechanism absorbs the weight occurring during use of the device for adjusting the seat depth such that said weight is passed on by the supporting element into the base element and the first guide mechanism has two longitudinal guides which are spaced apart from each other transversely with respect to the adjustment direction and which extend in the adjustment direction; and wherein each longitudinal guide comprises a guide element guided movably in the adjustment direction in a corresponding guide track, the respective guide element being underdimensioned with respect to the assigned guide track in such a manner that there is a predetermined minimum play in the direction of the horizontal transverse axis;
 wherein the support element is guided on the base element along the adjustment direction with the second guide mechanism in an essentially play-free manner in the direction of the horizontal transverse axis; and
 wherein the second guide mechanism is configured as a single rail guide which is formed by two guide profiles movable with respect to each other in the adjustment direction and being essentially U-shaped in cross-section; and wherein one of the guide profiles engages with its angled end sections behind sliding guide elements provided on the angled end sections of the other guide profile such that the one guide profile is held with its angled end sections between the angled end sections of the other guide profile and the sliding guide elements, the two guide rails being braced against each other by the sliding guide elements.

2. The device for adjusting the seat depth of claim 1, wherein the second guide mechanism is spaced apart from the first guide mechanism in a direction perpendicular to the adjustment direction and perpendicular to the support direction.

3. The device for adjusting the seat depth of claim 1, wherein the second guide mechanism extends between the two longitudinal guides in the adjustment direction.

4. The device for adjusting the seat depth of claim 1, wherein the first guide mechanism comprises at least one guide element guided in a longitudinally movable manner in a guide track extending in the adjustment direction.

5. The device for adjusting the seat depth of claim 4, wherein the guide track is formed by a guide slot, wherein the guide element engages in a positive-locking manner in the guide slot.

6. The device for adjusting the seat depth of claim 1, wherein the two guide profiles additionally intermesh in a play-free manner in the support direction.

7. The device for adjusting the seat depth of claim 1, further comprising a lock device configured to lock a previously set position of the support element with respect to the base element.

8. The device for adjusting the seat depth of claim 7, wherein the lock device comprises a pivotably mounted lock element configured to lock and unlock the support element with respect to the base element.

9. The device for adjusting the seat depth of claim 8, wherein the lock element is mounted pivotably about an axis extending in the adjustment direction.

10. The device for adjusting the seat depth of claim 8, wherein the support element comprises a manual actuating mechanism for introducing an adjustment force, wherein the manual actuating mechanism comprises an actuating handle, and wherein the actuating handle is operatively connected to the lock element via an extension such that, when force is exerted on the actuating handle in the adjustment direction, the lock element is unlocked.

11. The device for adjusting the seat depth of claim 8, wherein the lock element is provided with at least one locking tooth wherein, for the locking and unlocking, the locking tooth is configured to be brought into and out of engagement with at least one of a plurality of latching points arranged consecutively in the adjustment direction.

12. The device for adjusting the seat depth of claim 11, wherein the latching points are formed by latching openings.

13. The device for adjusting the seat depth of claim 11, wherein the second guide mechanism comprises two guide profiles which are movable with respect to each other in the adjustment direction and intermesh in a play-free manner in a direction transversely with respect to the adjustment direction and to the support direction, wherein the latching points are provided on one of the guide profiles.

14. The device for adjusting the seat depth of claim 13, wherein the latching points are provided on the base surface of the guide profile, the guide profile being U-shaped in cross section.

15. The device for adjusting the seat depth of claim 13, wherein the lock element is mounted on the guide profile and is movable relative to the guide profile.

16. The device for adjusting the seat depth of claim 15, wherein the lock element is arranged in a cavity defined by the guide profiles.

17. The device for adjusting the seat depth of claim 15, wherein the guide profile mounted on the lock element has passage openings, wherein the locking element is configured to engage in the passage openings with locking teeth in the locked state.

18. The device for adjusting the seat depth of claim 17, wherein the passage openings are provided in a base surface of said guide profile.

19. The device for adjusting the seat depth of claim 13, wherein the lock element extends between limbs of the guide profiles, the guide profiles being U-shaped in cross section.

20. The device for adjusting the seat depth of claim 7, wherein the lock device is prestressed in the direction of the locked state of the support element and the base element.

21. The device for adjusting the seat depth of claim 1, wherein the support element comprises a manual actuating mechanism for introducing an adjustment force.

22. The device for adjusting the seat depth of claim 21, wherein the manual actuating mechanism comprises an actuating handle arranged on the support element.

23. The device for adjusting the seat depth of claim 22, further comprising a lock device configured to lock a previously set position of the support element with respect to the base element, wherein the actuating handle is mounted movably and is coupled to the manual actuating mechanism in such a manner that, when force is applied to the actuating handle in the adjustment direction, the actuating handle unlocks the lock device.

24. The device for adjusting the seat depth of claim 23, wherein the actuating handle is configured as a pivotably mounted actuating lever.

25. The device for adjusting the seat depth of claim 1, wherein the support element is configured as a leg support for a motor vehicle seat.

26. The device for adjusting the seat depth of claim 1, wherein the first guide mechanism comprises at least one support region wherein the support element is configured to be supported on the base element in the support direction via the support region so that the second guide mechanism is at least partially relieved of the action of the weight occurring during normal use of the device for adjusting the seat depth.

27. The device for adjusting the seat depth of claim 26, wherein the support region extends along the first guide mechanism in the adjustment direction.

28. The device for adjusting the seat depth of claim 1, wherein a jamming of the device for adjusting the seat depth is prevented by providing a sufficient play at the first guide mechanism while a defined, rattle-free guidance is ensured by the second guide mechanism.

* * * * *